(12) United States Patent
O'Hora

(10) Patent No.: US 11,912,248 B2
(45) Date of Patent: *Feb. 27, 2024

(54) ROBOTICS FOR ROTATING ENERGY CELLS IN VEHICLES

(71) Applicant: SynCells, Inc., Boston, MA (US)

(72) Inventor: Gerard O'Hora, Brighton, MA (US)

(73) Assignee: SynCells, Inc., Boston, MA (US)

( * ) Notice: Subject to any disclaimer, the term of this patent is extended or adjusted under 35 U.S.C. 154(b) by 83 days.

This patent is subject to a terminal disclaimer.

(21) Appl. No.: 17/108,943

(22) Filed: Dec. 1, 2020

(65) Prior Publication Data

US 2021/0086729 A1    Mar. 25, 2021

Related U.S. Application Data

(63) Continuation of application No. 16/167,331, filed on Oct. 22, 2018, now Pat. No. 10,850,713.

(60) Provisional application No. 62/574,923, filed on Oct. 20, 2017.

(51) Int. Cl.
| | |
|---|---|
| *B60S 5/06* | (2019.01) |
| *B60L 53/80* | (2019.01) |
| *B25J 5/00* | (2006.01) |
| *B25J 11/00* | (2006.01) |
| *B25J 15/00* | (2006.01) |

(52) U.S. Cl.
CPC ............ *B60S 5/06* (2013.01); *B25J 5/007* (2013.01); *B25J 11/00* (2013.01); *B25J 11/008* (2013.01); *B25J 15/00* (2013.01); *B60L 53/80* (2019.02)

(58) Field of Classification Search
CPC ... B60S 5/06; B60L 53/80; B25J 5/007; B25J 11/00; B25J 11/008; B25J 15/00
See application file for complete search history.

(56) References Cited

U.S. PATENT DOCUMENTS

| | | | |
|---|---|---|---|
| 2,938,686 A | 5/1960 | Winkle et al. | |
| 5,756,227 A | 5/1998 | Suzuki et al. | |
| 6,122,603 A | 9/2000 | Budike, Jr. | |
| 7,059,769 B1 | 6/2006 | Potega | |
| 7,602,143 B2 * | 10/2009 | Capizzo | G07F 7/06 320/109 |
| 7,949,435 B2 | 5/2011 | Pollack et al. | |
| 8,359,112 B2 | 1/2013 | Kephart et al. | |

(Continued)

FOREIGN PATENT DOCUMENTS

| | | |
|---|---|---|
| CN | 108352537 | 7/2018 |
| EP | 2861473 | 4/2015 |

(Continued)

OTHER PUBLICATIONS

U.S. Appl. No. 15/225,620, Non-Final Office Action, dated Nov. 9, 2016, 23 pages.

(Continued)

*Primary Examiner* — Bryan A Evans
(74) *Attorney, Agent, or Firm* — Kilpatrick Townsend & Stockton LLP

(57) ABSTRACT

An energy module exchange system may include an enclosure with one or more storage racks configured to store and charge energy modules; an opening in the enclosure; and a robotic arm configured to retrieve the energy modules from the storage racks and pass them through an opening in the enclosure for exchange with an electric vehicle.

14 Claims, 10 Drawing Sheets

(56) References Cited

U.S. PATENT DOCUMENTS

| | | |
|---|---|---|
| 8,406,477 B2 | 3/2013 | Chen et al. |
| 8,473,111 B1 | 6/2013 | Shankar et al. |
| 8,816,870 B2 | 8/2014 | Plaisted et al. |
| 8,830,676 B2 | 9/2014 | Borck et al. |
| 8,865,337 B2 | 10/2014 | Culver et al. |
| 8,907,811 B2 | 12/2014 | Windstrup et al. |
| 9,187,004 B1 * | 11/2015 | Davis ............... B60L 53/30 |
| 9,300,141 B2 | 3/2016 | Marhoefer |
| 9,434,270 B1 | 9/2016 | Penilla et al. |
| 9,438,573 B2 | 9/2016 | Cregg |
| 9,680,188 B2 | 6/2017 | O'Hora |
| 9,711,989 B2 | 7/2017 | Shin et al. |
| 9,716,718 B2 | 7/2017 | Belton, Jr. et al. |
| 9,817,376 B1 | 11/2017 | Wartena et al. |
| 9,819,060 B2 | 11/2017 | O'Hora |
| 9,912,015 B2 | 3/2018 | O'Hora |
| 10,147,984 B2 | 12/2018 | O'Hora |
| 10,203,738 B2 | 2/2019 | O'Hora |
| 10,850,713 B2 | 12/2020 | O'Hora |
| 2002/0136042 A1 | 9/2002 | Layden et al. |
| 2003/0099883 A1 | 5/2003 | Ochoa et al. |
| 2005/0007042 A1 | 1/2005 | Moore et al. |
| 2006/0276938 A1 | 12/2006 | Miller |
| 2007/0127346 A1 | 6/2007 | Goodman et al. |
| 2007/0181547 A1 | 8/2007 | Vogel et al. |
| 2007/0267999 A1 | 11/2007 | Buckley et al. |
| 2008/0072289 A1 | 3/2008 | Aoki et al. |
| 2008/0197199 A1 | 8/2008 | Terlizzi et al. |
| 2009/0096416 A1 | 4/2009 | Tonegawa et al. |
| 2009/0198372 A1 * | 8/2009 | Hammerslag ......... B60L 53/305 700/226 |
| 2009/0251925 A1 | 10/2009 | Usui et al. |
| 2009/0314382 A1 | 12/2009 | Capizzo |
| 2010/0007515 A1 | 1/2010 | Ito |
| 2010/0017045 A1 | 1/2010 | Nesler et al. |
| 2010/0104927 A1 | 4/2010 | Albright |
| 2010/0104935 A1 | 4/2010 | Hermann et al. |
| 2010/0141206 A1 * | 6/2010 | Agassi ............... B60K 1/04 320/109 |
| 2010/0245103 A1 | 9/2010 | Plaisted et al. |
| 2010/0315197 A1 | 12/2010 | Solomon et al. |
| 2011/0014501 A1 | 1/2011 | Scheucher |
| 2011/0106294 A1 * | 5/2011 | Bebbington ............ B60L 53/80 700/218 |
| 2011/0204720 A1 | 8/2011 | Ruiz et al. |
| 2011/0234165 A1 | 9/2011 | Palatov |
| 2011/0261057 A1 | 10/2011 | Freyhult et al. |
| 2011/0302078 A1 | 12/2011 | Failing |
| 2012/0039503 A1 | 2/2012 | Chen et al. |
| 2012/0169511 A1 | 7/2012 | Windstrup et al. |
| 2012/0316671 A1 | 12/2012 | Hammerslag et al. |
| 2013/0026972 A1 | 1/2013 | Luke et al. |
| 2013/0059182 A1 | 3/2013 | Komatsu et al. |
| 2013/0164567 A1 | 6/2013 | Olsson et al. |
| 2013/0166081 A1 | 6/2013 | Sanders et al. |
| 2013/0205372 A1 | 8/2013 | Gilbert et al. |
| 2013/0214763 A1 | 8/2013 | Kubota et al. |
| 2013/0288083 A1 | 10/2013 | Sweetland et al. |
| 2013/0297084 A1 | 11/2013 | Kubota et al. |
| 2013/0315197 A1 | 11/2013 | Park et al. |
| 2014/0015469 A1 | 1/2014 | Beaston et al. |
| 2014/0097797 A1 | 4/2014 | Hendrix et al. |
| 2014/0136007 A1 | 5/2014 | Williams |
| 2014/0336837 A1 | 11/2014 | Kiuchi et al. |
| 2014/0377623 A1 | 12/2014 | Pyzza et al. |
| 2015/0037649 A1 | 2/2015 | Wyatt et al. |
| 2015/0042285 A1 | 2/2015 | Doerndorfer |
| 2015/0048684 A1 | 2/2015 | Rooyakkers et al. |
| 2015/0056475 A1 | 2/2015 | Adrian et al. |
| 2015/0073608 A1 | 3/2015 | Ippolito et al. |
| 2015/0261198 A1 | 9/2015 | Rice |
| 2015/0333512 A1 | 11/2015 | Saussele et al. |
| 2015/0350818 A1 | 12/2015 | Hammett et al. |
| 2016/0003918 A1 | 1/2016 | Wada et al. |
| 2016/0033946 A1 | 2/2016 | Zhu et al. |
| 2016/0093843 A1 | 3/2016 | Reineccius et al. |
| 2016/0093848 A1 | 3/2016 | DeKeuster et al. |
| 2016/0094056 A1 | 3/2016 | Dulle |
| 2016/0129801 A1 | 5/2016 | Gale et al. |
| 2016/0329710 A1 | 11/2016 | Clifton |
| 2017/0033337 A1 | 2/2017 | O'Hora |
| 2017/0033338 A1 | 2/2017 | O'Hora |
| 2017/0033408 A1 | 2/2017 | O'Hora |
| 2017/0085438 A1 | 3/2017 | Link et al. |
| 2017/0242411 A1 | 8/2017 | Papadopoulos |
| 2017/0279170 A1 | 9/2017 | O'Hora |
| 2018/0356114 A1 | 12/2018 | O'Hora |
| 2018/0356867 A1 | 12/2018 | O'Hora |
| 2018/0359109 A1 | 12/2018 | O'Hora |
| 2019/0103641 A1 | 4/2019 | O'Hora |
| 2019/0132145 A1 | 5/2019 | O'Hora |

FOREIGN PATENT DOCUMENTS

| | | |
|---|---|---|
| EP | 2876702 | 5/2015 |
| KR | 101146492 | 5/2012 |
| WO | 2012041140 A1 | 4/2012 |
| WO | 2014207658 | 12/2014 |
| WO | 2017023869 | 2/2017 |
| WO | 2018231932 | 12/2018 |
| WO | 2019079817 | 4/2019 |

OTHER PUBLICATIONS

U.S. Appl. No. 15/225,620, Notice of Allowance, dated Apr. 11, 2017, 8 pages.

U.S. Appl. No. 15/225,656, Non-Final Office Action, dated Nov. 30, 2016, 11 pages.

U.S. Appl. No. 15/225,656, Notice of Allowance, dated Jul. 5, 2017, 11 pages.

U.S. Appl. No. 15/225,680, First Action Interview Office Action Summary, dated Mar. 27, 2017, 9 pages.

U.S. Appl. No. 15/225,680, First Action Interview Pilot Program Pre-Interview Communication, dated Nov. 30, 2016, 7 pages.

U.S. Appl. No. 15/225,680, Notice of Allowance, dated Aug. 25, 2017, 12 pages.

U.S. Appl. No. 15/621,268, Non-Final Office Action, dated Jan. 24, 2018, 17 pages.

U.S. Appl. No. 15/621,268, Notice of Allowance, dated Sep. 24, 2018, 13 pages.

U.S. Appl. No. 15/621,364, "Corrected Notice of Allowability", dated Oct. 18, 2018, 2 pages.

U.S. Appl. No. 15/621,364, Non-Final Office Action, dated Dec. 15, 2017, 25 pages.

U.S. Appl. No. 15/811,659, Non-Final Office Action, dated Feb. 25, 2019, 19 pages.

U.S. Appl. No. 16/167,331, Non-Final Office Action, dated Jan. 9, 2020, 8 pages.

U.S. Appl. No. 16/167,331, Notice of Allowance, dated Jul. 27, 2020, 10 pages.

Mbeam, "First Updated Module", Available online at http://www.modularexchange.com/?p=314, Accessed from Internet on Jul. 1, 2016, 18 pages.

Mbeam, "The Modular Battery Exchange System: A Common Sense Approach to Full Adoption of Clean Electric Transportation", Available online at http://www.modularexchange.com/?page_id=141, Accessed from Internet on Jul. 1, 2016, 10 pages.

* cited by examiner

ROBOTICS FOR ROTATING ENERGY CELLS IN VEHICLES

CROSS-REFERENCES TO RELATED APPLICATIONS

The present application is a continuation of U.S. patent application Ser. No. 16/167,331, filed Oct. 22, 2018, which is incorporated herein by reference. U.S. patent application Ser. No. 16/167,331 is a nonprovisional of and claims the benefit of U.S. Provisional Application No. 62/574,923, filed Oct. 20, 2017, which is incorporated herein by reference.

BACKGROUND

At one point in history, electric vehicles outnumbered vehicles with combustion engines. They were simple to build and less expensive, using wet cells in glass jars as their energy source well before the 12 V lead-acid battery was feasible. The major limitation of electric vehicles was the same then as it is now: battery capacity and range. Batteries need to be recharged or replaced in order to provide a driving range that competes with combustion-engine vehicles.

SUMMARY

An energy module exchange system may include an enclosure with one or more storage racks configured to store and charge energy modules; an opening in the enclosure; and a robotic arm configured to retrieve the energy modules from the storage racks and pass them through an opening in the enclosure for exchange with an electric vehicle.

A method may include storing and/or charging a plurality of energy modules in one or more storage racks of an enclosure; retrieving, using a robotic arm, one or more of the plurality of energy modules from the storage racks; and passing, using the robotic arm, the one or more of the plurality of energy modules through an opening in the enclosure for exchange with an electric vehicle.

In any embodiments any or all of the following features may be implemented in any combination and without limitation. The system may include a mobile robot. The robotic arm may exchange energy modules with the electric vehicle. The robotic arm may exchange energy modules with the mobile robot. The robotic arm may exchange energy modules with a human user. The robotic arm may include an effector configured to mate with a corresponding handle of the energy modules. The effector may include one or more hooks configured to be inserted underneath the corresponding handle of the energy modules. The effector may be configured to actuate the corresponding handle of the energy modules from a first position into a second position, wherein the second position may unlock the energy modules from the electric vehicle. A computerized management system may electronically receive status information from the electric vehicle. The one or more storage racks in the enclosure may be further configured to store packages from another service, and the robotic arm may be configured to deliver the packages to a user of the electric vehicle.

BRIEF DESCRIPTION OF THE DRAWINGS

A further understanding of the nature and advantages of the present invention may be realized by reference to the remaining portions of the specification and the drawings, wherein like reference numerals are used throughout the several drawings to refer to similar components.

In some instances, a sub-label is associated with a reference numeral to denote one of multiple similar components. When reference is made to a reference numeral without specification to an existing sub-label, it is intended to refer to all such multiple similar components.

DETAILED DESCRIPTION

Figure 1A:
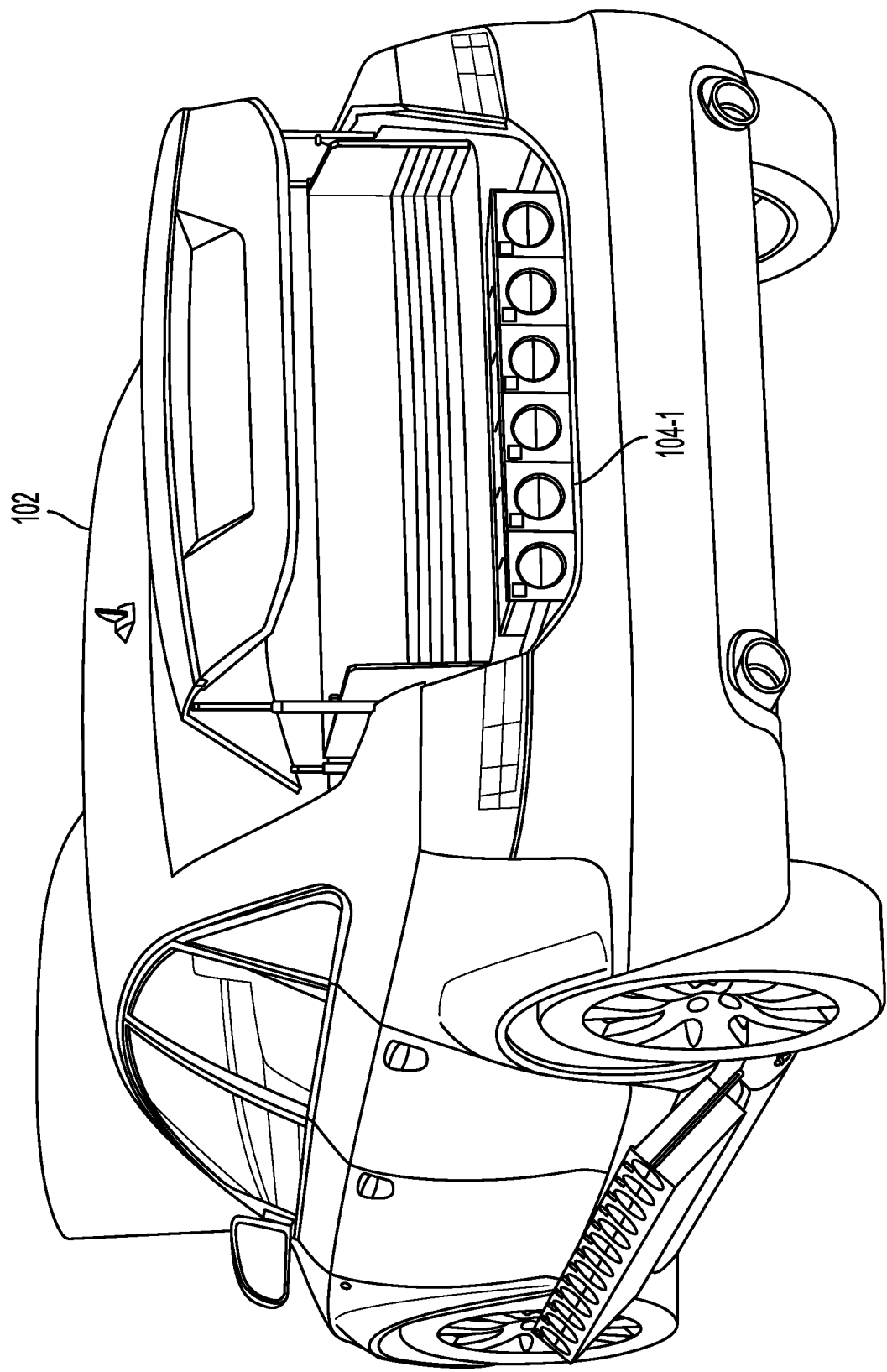
FIG. 1A illustrates a rear view of an electric vehicle with an array of energy modules stored in the rear of the vehicle.

Since the time that electric vehicles were first developed, there have been many attempts to implement long-range electric vehicles that can compete with combustion-engine vehicles. Instead of recharging a fixed battery in the electric vehicle, one solution proposes swapping out battery cells from the electric vehicle periodically. However, this is a difficult proposition because most car batteries are located under the entire underbody of the electric vehicle and are not meant to be removed. To swap these types of batteries in electric vehicles, a system would need to basically replace the entire underbody of the electric vehicle containing the storage cells with a freshly charged unit. To be competitive, this would have to be done in less time than the charging process would take. Additionally, these existing battery modules may have excessive weight, size, and cost that makes rapid swap stations cost prohibitive, of limited flexibility, and may require greater accommodations in vehicle design across manufacturers to be successful.

Battery technologies and chemistries are rapidly changing. Energy densities increase year-over-year, and solutions such as metal/lithium-air provide 10 to 15 times the capacity over what is currently available in electric storage cells today. This potentially puts electric storage cells on par with hydrocarbon fuels in terms of energy density. The embodiments described herein present a system for energy storage and cell-swapping technology that is based on small modules that can be swapped by hand and/or by automated machinery and used across a variety of applications. These energy cells can be used in electric vehicles, in the home, in a commercial office building, and in other locations. The system is expandable and flexible to support other applications and future requirements, possibly in conjunction with hydrogen fuel cells. The system uses energy modules as part of a hybrid, "plug-and-play" architecture that can accommodate a variety of users, vehicle types, applications, and use cases.

Standardized energy modules can implement an energy storage system using battery technology, fuel cell technology, hydrogen, and so forth. The small energy modules can include hydrogen storage vessels, and can use the fuel cells to reform natural gas during times of day when the system is available. Described specifically herein are robotics that are used to swap energy modules of any type between an electric vehicle and another repository, such as a home storage system, a commercial storage system, another electric vehicle, a charging station, and so forth. The small footprint of these energy modules allows for manual handling, which can be used as an alternative should the automated swap stations require maintenance or be otherwise non-operable. Such swap stations can replace the dearth of traditional gas stations that served a variety of purposes. In addition to providing gasoline, they also act as a convenience store, coffee stop, and more. The automated swap stations described herein are smaller and easier to deploy, with less environmental issues, and provide opportunities for community service through energy storage and energy security solutions. The same swap technology can be leveraged for the next generation of corner/convenience store, using robotics and machine learning to "pick & place" goods for customers to purchase through an automated interface and process.

FIG. 1A illustrates a rear view of an electric vehicle 102 with an array of energy modules 104-1 stored in the rear of the vehicle. The energy modules 104-1 may be accessible by opening the trunk of the electric vehicle 102. In some embodiments, the energy modules 104-1 can be stored underneath a panel of the trunk of the electric vehicle 102. When the energy modules 104-1 need to be swapped, the panel of the trunk can raise up such that the energy modules 104-1 are accessible to a user and/or a robot arm. In some embodiments, the energy modules are located below the trunk space. The whole trunk space can lift up to expose the energy modules so that the contents of the trunk space do not need to be unpacked to access the energy modules 104-1. This can be accomplished using a dual hinge or dual motion unit such that the energy modules 104-1 can be accessed from above or below.

Each of the energy modules 104 described herein may be small enough to be carried by hand (e.g., 6"×6"×12"), and may include a locking handle on the front of the energy modules that can be used to lock the energy modules 104 in place in the electric vehicle 102, to remove the energy modules 104 from the electric vehicle by hand, and/or to provide a mate-able component for an electric arm to couple with the energy modules 104 during removal and/or transportation. Each of the energy modules 104 may include an interface on the back side of the energy modules 104 that provides electrical power, communications, authentication, serial commands, encrypted data, and so forth. The backside of the energy modules 104 may also include interfaces that deliver liquid coolant to each of the energy modules 104, remove waste materials from the energy modules 104, and/or deliver substances that may be used for electrical energy generation, such as electrolytes.

Figure 1B:
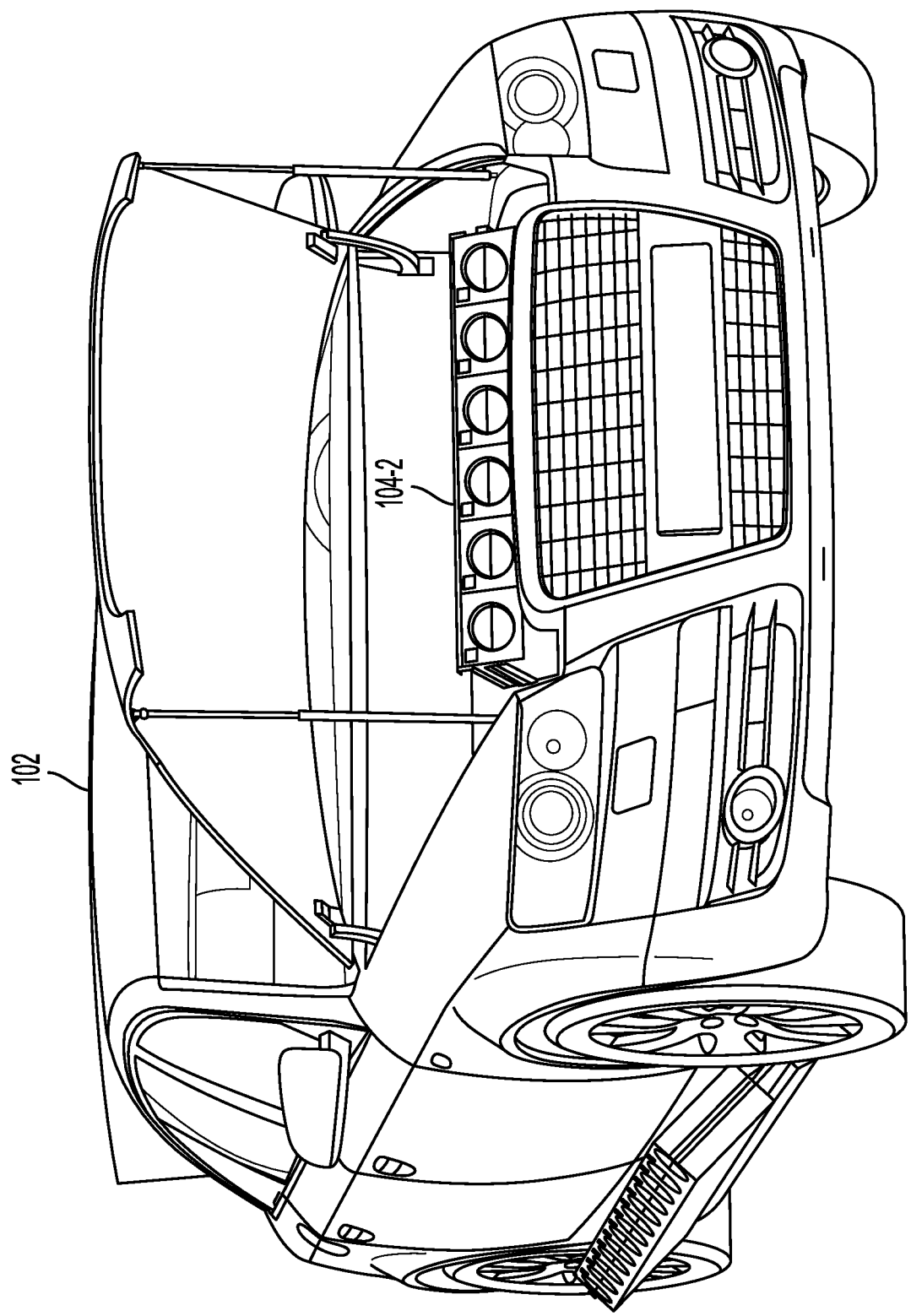
FIG. 1B illustrates a front view of the electric vehicle with an array of energy modules stored under the hood of the vehicle.

FIG. 1B illustrates a front view of the electric vehicle 102 with an array of energy modules 104-2 stored in the hood of the vehicle. The energy modules 104-2 may be accessible by opening the hood of the electric vehicle 102. When the hood is raised, the energy modules 104-2 may be exposed as shown in FIG. 1B in a fixed position. In some embodiments, the energy modules 104-2 may instead be lowered down into the hood area of the electric vehicle 102 until the hood is opened. Then, the energy modules 104-2 can be automatically raised to expose their handles. Alternatively, a control can be activated that raises the energy modules 104-2 after the hood is opened.

Figure 1C:
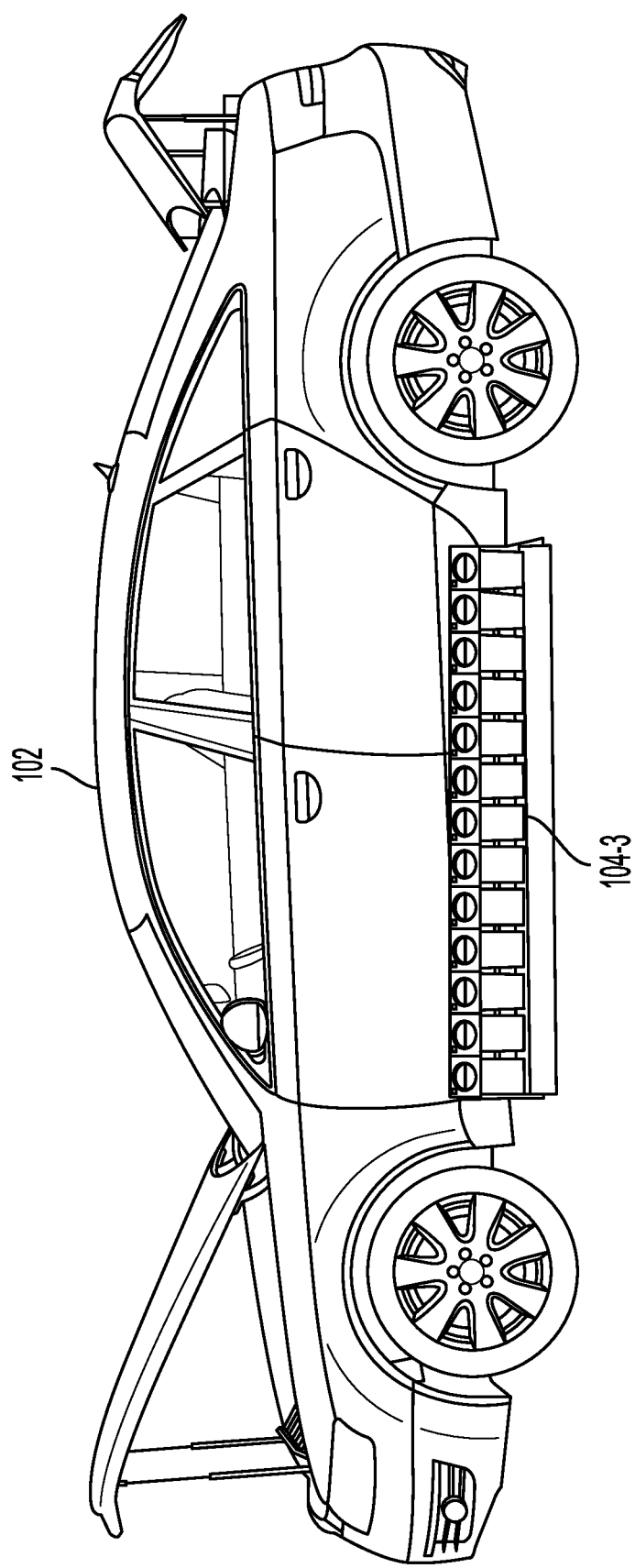
FIG. 1C illustrates a side view of the electric vehicle with an array of energy modules stored in the side of the vehicle.

FIG. 1C illustrates a side view of the electric vehicle 102 with an array of energy modules 104-3 stored in the side of the vehicle. Energy modules are traditionally stored under the chassis of the electric vehicle. The energy modules 104-3 can be stored in a similar location, but can be made easily accessible by opening a compartment in the electric vehicle 102 that exposes the handles of the energy modules 104-3. Some embodiments may automatically extend the energy modules 104-3 out of the electric vehicle 102 when the compartment is opened to make them easy to access and swap. For example, modules can be stored behind a rocker panel of the vehicle. The rocker panel can swing down and allow the energy modules 104-3 to be exposed for access. In some embodiments, the energy modules 104-3 can also be extended outward from the electric vehicle 102.

Figure 2:
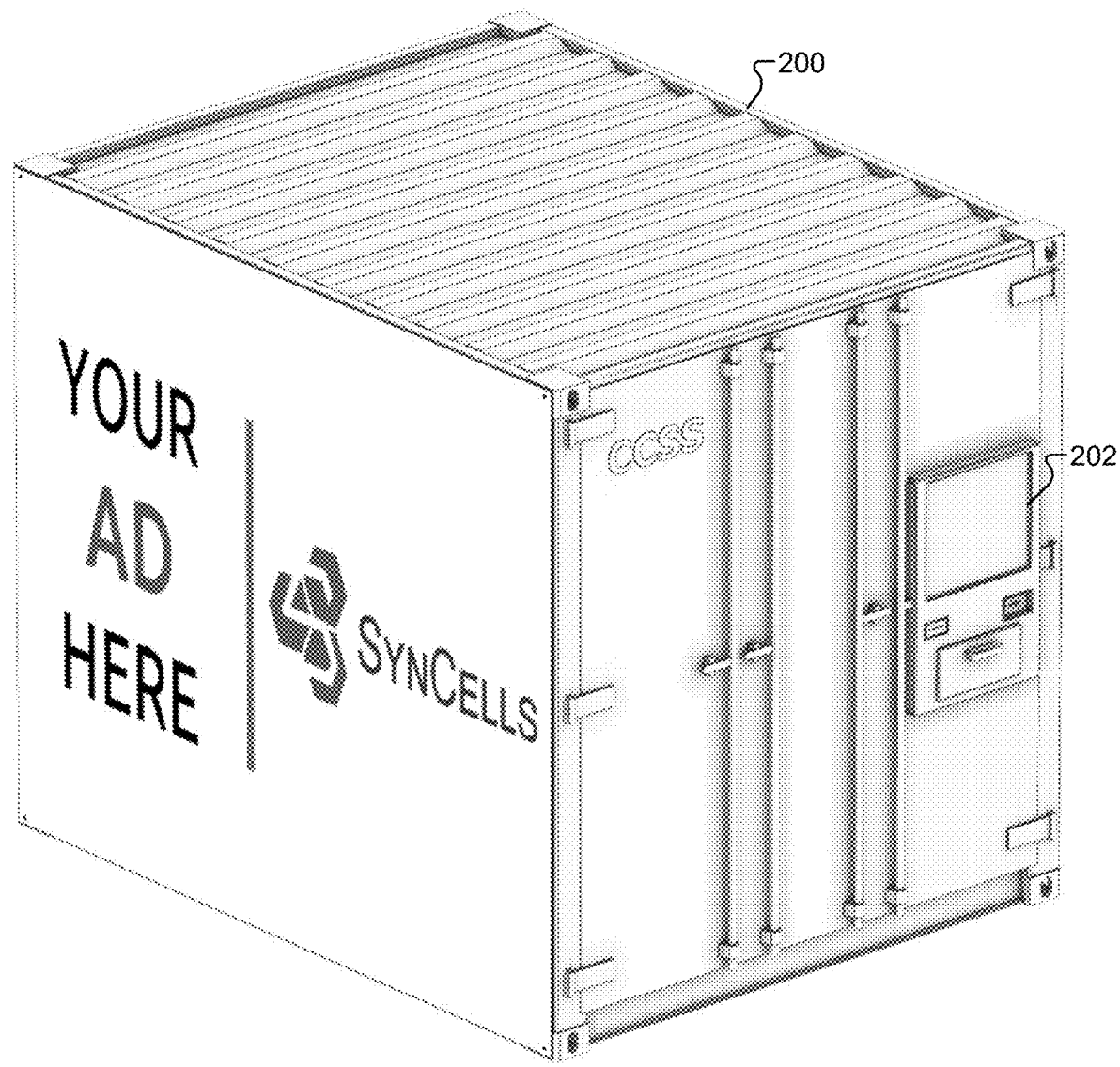
FIG. 2 illustrates a commercial charging and swapping station (CCSS), according to some embodiments.

FIG. 2 illustrates a commercial charging and swapping station (CCSS) 200, according to some embodiments. In some embodiments, the CCSS 200 can use the form factor of a standard shipping container, for example, of 20'×8'. The CCSS 200 can include an area for advertisements or other informational displays. This may include a series of clips, hanging rails, rotating toggles, and other mechanical hardware on the exterior of the CCSS 200 that may allow billboards or other advertising opportunities. The CCSS 200 can also include a human interface and kiosk that may be used by a human user. For example, the CCSS 200 can include electronic interface 202 that allows a user to enter information, such as battery models, serial numbers, energy module quantities, electrical characteristics, account numbers, and so forth. In one scenario, a human user can provide a number and type of energy modules that need to be swapped through the interface 202, and the CCSS 200 can provide charged energy modules that can be hand-swapped into the user's electric vehicle 102. The user can then return the spent energy modules from the vehicle 102 to the interface 202 of the self-serve kiosk. Some embodiments may include several doors and/or panels for access and maintenance into the CCSS 200. These can be monitored through contact switches or other mechanisms to prevent unauthorized access, along with worker safety by shutting down robotic systems inside the CCSS 200 during maintenance or when the doors and/or panels are open.

Note that the CCSS 200 allows a user to drive up to the CCSS 200 and swap energy modules from the side/front/rear of the electric vehicle 102. This negates the need for the vehicle to drive over the swapping infrastructure that typically removes modules from underneath the electric vehicle 102 using an underground facility. The CCSS 200 is above ground and is therefore easily relocated when needed. The robotic arms and/or mobile robots described below allow for swapping of energy modules on all sides of vehicle. For example, large vehicles such as buses can store energy modules on any side of the bus, as well as underneath the bus to be accessed by a robotic arm. Unlike in-ground or other existing swapping systems that require close alignment of the electric vehicle to the swapping station, the CCSS 200 has much greater flexibility through the use of multi-axis 3-D robotics (e.g., 6 axis) that can handle multiple vehicle types, sizes, and alignments relative to the CCSS 200. These 3-D robotics are described in greater detail below. When the CCSS 200 is relocated to a new position, the CCSS 200 may include leveling feet, anchors, and/or other mechanical components that can be used to level and/or plum the structure. Similarly, robotic rails on the inside of the CCSS 200 can be fine-tuned through a series of adjusters for reliable operation when the CCSS 200 is relocated. Ultimately, the CCSS 200 can be deployed on a site with minimal ground preparation and without the need for extensive excavation work. This can be contrasted with the extensive infrastructure required to support in-ground swapping stations. For example, a CCSS 200 can be deployed in a parking structure without interfering with the building's structure or other existing building systems.

As described above, the CCSS 200 can use a standard shipping container as a basis for its design that acts as an enclosure that is uniform in size, structure, integrity, security, and so forth. A CCSS 200 may be easily customized to add internal members for supporting storage bays, robotic tracks and/or arms, sensors, and other electrical/mechanical systems. In other embodiments, a CCSS 200 may use an enclosure akin to a shipping container but that is collapsible and modular, whereby the sides can be separated from the top and bottom, thus making it easier for enclosures to be positioned when moved to a new site. The individual surfaces may be held together through a series of pins, bolts, or other hardware that allows for easy assembly and/or disassembly.

Each CCSS 200 can include a computerized management system to track each energy module charge state, history, and/or other factors to ensure that the energy modules maintain an ideal lifecycle. The computerized management system can also ensure that the appropriate module is tagged for swapping in a particular vehicle along with other considerations. The computerized management system can be constantly updated to include up-to-date charging scenarios and lifecycle information from a central server. The computerized management system may also govern human/machine interactions and/or interfaces, such as acting upon requests, settling account balances, and so forth. The computerized management system in the CCSS 200 can also be updated with information from other CCSS 200 containers. For example, during a long road trip, the user may stop at several CCSSs to swap energy modules. Information from each of these CCSSs can be shared via wired and/or wireless connections as energy modules are swapped from the same electric vehicle.

The computerized management system may maintain the status, charge level, lifecycle, and other information for energy modules in individual vehicles. This can be accomplished without compromising or storing personal information. When an electric vehicle pulls up to a CCSS 200, the computerized management system communicating with the CCSS 200 may retrieve stored information such that it knows a usage history of each energy module in the electric vehicle. The computerized management system can then determine which energy modules need to be swapped. This information can then be communicated to the user, for example, by providing a diagram on a display device illustrating graphically which energy modules need to be replaced and which can remain in the vehicle until the next swap station is encountered. Alternatively, this information can be provided to an electric arm or mobile robot to automatically swap the designated energy modules from the electric vehicle without requiring user intervention. When the electric vehicle pulls up to the CCSS 200, electric vehicle can communicate wirelessly with the computerized management system to provide real-time energy module information, such as charge levels, current levels, voltage levels, operating times, and other information. This information can also be provided to the CCSS 200 through a Wi-Fi, cellular, or other wireless data connection when the electric vehicle is not in proximity of the CCSS 200.

The CCSS 200 can include significant monitoring, management, and communication abilities, both for systems and energy modules within the enclosure, but also externally as an integral part of a secure energy ecosystem. Additionally, the CCSS 200 may require an authentication process for each electric vehicle 102. When a driver pulls up alongside the CCSS 200, they can initiate communications with the CCSS 200 using, for example, a smart phone device that connects and/or authenticates the electric vehicle 102 and/or the user with a CCSS 200. As part of the profile handshake, the vehicle type, energy module type, and other relevant criteria can be exchanged with the CCSS 200 such that a CCSS 200 knows the overall parameters of the vehicle and how to exchange energy modules therewith.

The CCSS 200 can also be integrated into a larger energy ecosystem. For example, the CCSS 200 can be installed in a parking garage of a commercial building. The CCSS can then exchange energy with the commercial building and be tied into the energy systems as part of the energy ecosystem. The CCSS 200 can then be treated as an energy storage and/or generation device by the energy ecosystem to charge depleted energy modules. For example, one building management system may use an energy virtualization layer to accept new energy storage/generation devices and automatically integrate those devices into the energy ecosystem of the building. Any new energy modules that are inserted into the CCSS 200 may be recognized as new energy storage/generation devices to be used as part of the energy ecosystem of the building. The virtualization layer can then act as a hypervisor to control virtual devices that represent the energy modules. These energy modules can then provide energy to the building, or alternatively receive energy to be charged from the building depending on their charge level.

Figure 3:
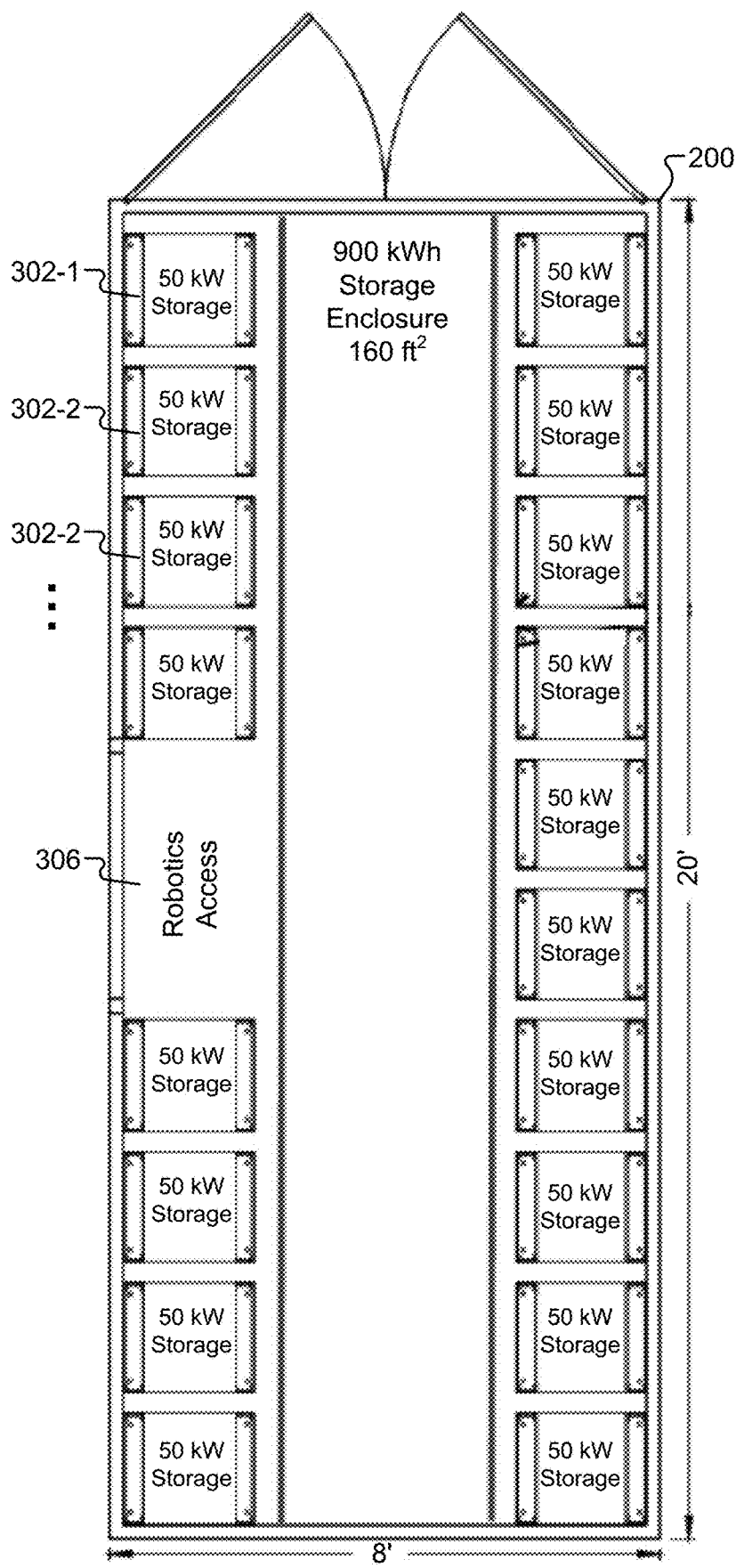
FIG. 3 illustrates the interior of a CCSS, according to some embodiments.

FIG. 3 illustrates the interior of a CCSS 200, according to some embodiments. In some embodiments, the CCSS 200 can utilize a standard shipping container as the basis of the design. However, in other embodiments, the system may also be deployed using standard construction techniques in commercial, residential, and/or industrial settings through the use of standardized racks, robotic systems, guides, sensors, and so forth. The interior of the CCSS 200 can include storage racks on each side of the length of the CCSS 200. Each storage rack may include multiple levels that store energy modules in a chassis or housing that can monitor and/or charge each of the energy modules. For example, each storage rack can include one or more 50 kW chassis or housing assemblies 302. Each storage rack can have a unique tagging that is machine/sensor readable to locate energy modules and properly align and/or couple with an energy module for removal/replacement. The CCSS 200 may include an electromechanically operated robotic hatch 306 where a robotic arm and/or a mobile robot can pass through to swap energy modules to/from a vehicle. In some embodiments, the storage racks can be configured like a typical IT rack, using a 19 inch to 24 inch rack with 4 feet of space between the storage racks.

In some embodiments, the CCSS 200 can be a multipurpose enclosure that handles additional services besides just swapping energy modules. For example, the CCSS 200 may also receive and handout mail-order packages (e.g., an Amazon® Locker), groceries, or other retail purchases to users. In short, the CCSS 200 can mimic a full-service gas station that is instead fully automated by the robotics described below. For example, the user can order prepackaged food or equipment through the self-serve kiosk 202 that can be retrieved by the internal robotics or mobile robot of the CCSS 200 for delivery to the user. In another example, the user can order mail-order goods from a mail-order supplier, such as Amazon®. The mail-order supplier can then send a request to the CCSS 200 that is nearest to the immediate location of the user. The CCSS 200 can then send a message to the electric vehicle or mobile phone of the user and indicate that there packages available for immediate pickup at the location of the CCSS 200. The user can then pull up next to the CCSS 200 and retrieve their package ordered just moments before from the mail-order supplier. Their package can be provided through a kiosk window, or may be delivered by a robotic arm or mobile robot as described below. This system allows the CCSS 200 to act as an intermediate delivery point for third party mail-order systems. Therefore the CCSS 200 can store packages, goods, materials, or other mail-order items that are commonly ordered from mail-order systems. In some embodiments, the computerized management system can communicate with a computerized supply chain management system of the mail-order systems to stock items that are commonly ordered. This allows the mail-order systems to contract out delivery services to small CCSS 200 locations that may be closer in proximity to the user and not require any human delivery methods.

Figure 4:
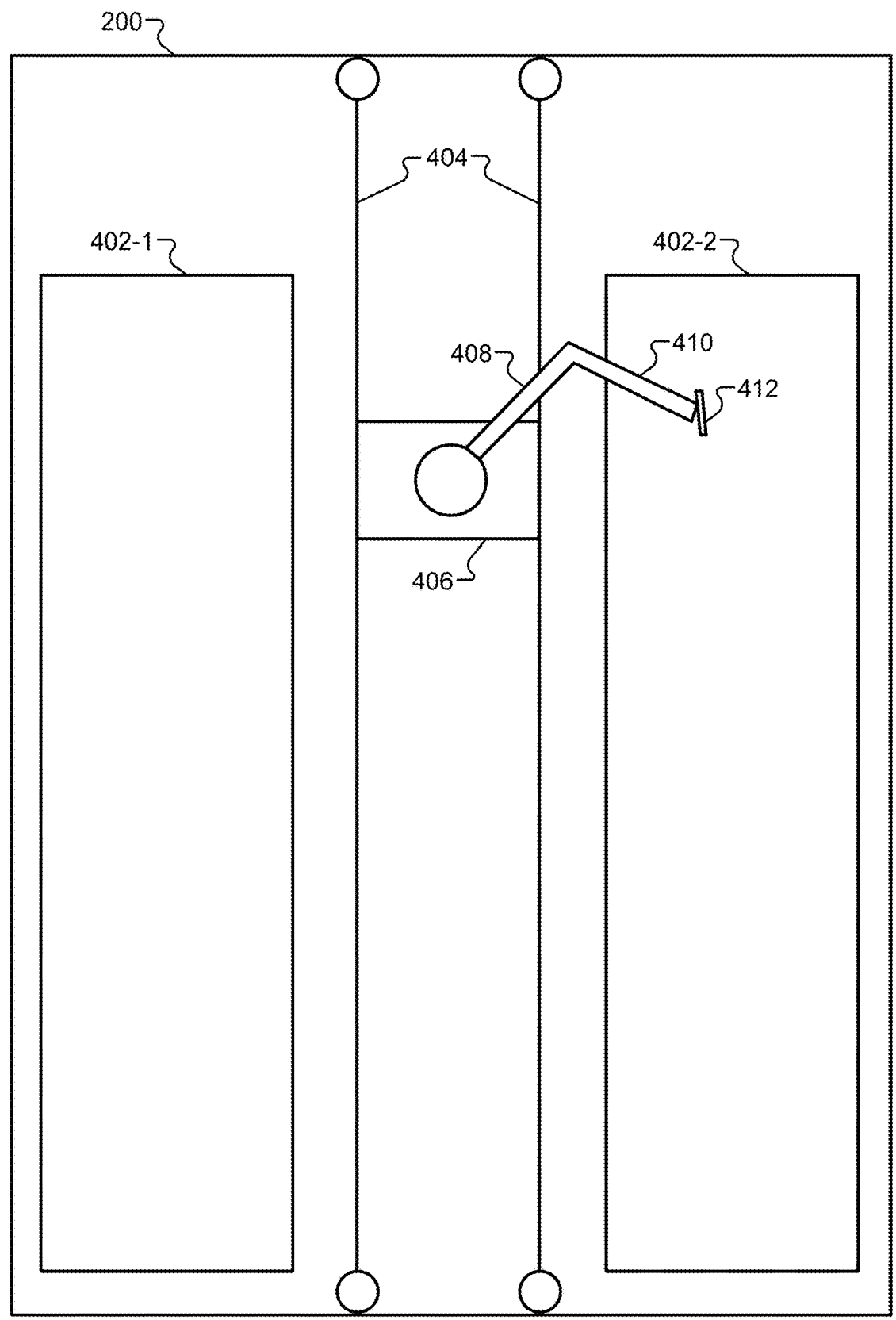
FIG. 4 illustrates a plan view of an interior of a CCSS, according to some embodiments.

FIG. 4 illustrates a plan view of an interior of a CCSS 200, according to some embodiments. In this view, the storage racks 402 run along each of the interior walls of the CCSS 200. In the center of a CCSS 200 is a track system with an attached robotic arm 406. The robotic arm 406 moves up and down a set of tracks 404 positioned on the floor/ceiling of the CCSS 200 to grab energy modules from the storage racks 402 and move them to the exterior of the CCSS 200.

In addition to the set of rails 404, the robotic arm 406 may include motors, hydraulics, pneumatics, electromechanical actuators, and so forth, to move the robotic arm 406 and grab energy modules in 3-D space. The robotic arm 406 may include multiple sections connected by mechanical hinges, such as a first section 408 and a second section 410. At the end of the second section 410, the robotic arm 406 may include one or more module handling effectors 412. The effectors 412 allow the robotic arm 406 to mechanically connect with one or more energy modules at a time. For example, the effector 412 can grab one or more modules from the storage racks 402 of the CCSS 200, and the robotic arm 406 can move along the set of rails 404 until the robotic arm 406 can be extended outside of the CCSS 200 for exchange with an electric vehicle 102. The ability to mechanically connect with more than one energy module allows a fresh set of energy modules to be retrieved from the CCSS 200 initially, such that the robotic arm 406 has the capacity to remove and replace the spent modules from electric vehicle 102 without needing to return to the interior of a CCSS 200. This can significantly reduce the overall swap time. To negate the excessive stress that may be associated with the weight of multiple energy modules, robotic arm 406 may include a caster wheel that moves with the arm to support the load on extensions of the second section 410 of the robotic arm 406. This may also provide greater accuracy for aligning the robotic arm 406 vertically with energy modules in electric vehicles 102. The set of rails 404 of the robotic army also be used for quick loading of the storage racks 402 via a forklift or other device, allowing a full rack of energy modules to be loaded into the CCSS 200 at a time.

Figure 5:
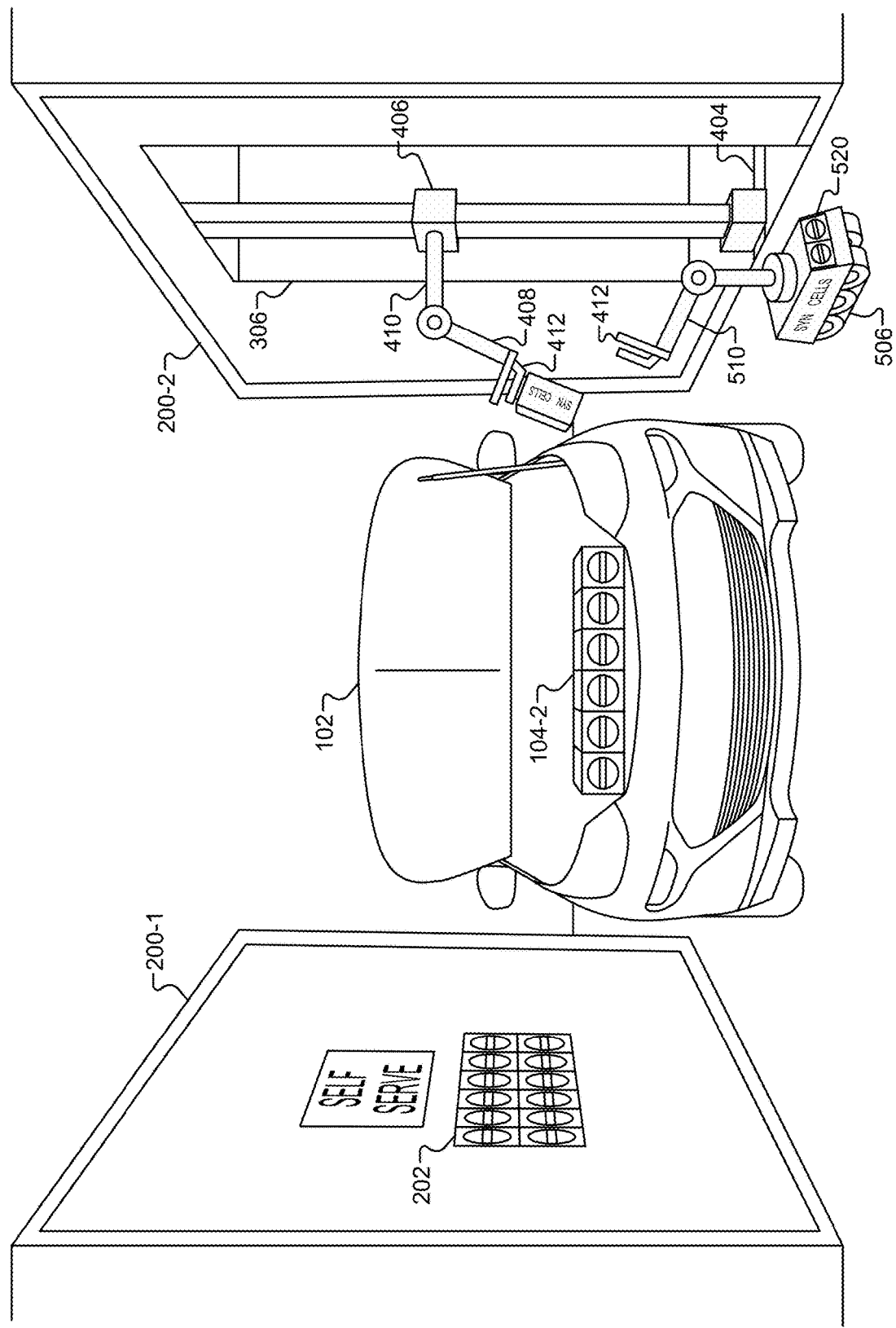
FIG. 5 illustrates a set up for exchanging energy modules from an electric vehicle through a CCSS, according to some embodiments.

FIG. 5 illustrates a set up for exchanging energy modules from an electric vehicle 102 through a CCSS 200, according to some embodiments. In this embodiment, a pair of CCSSs 200-1, 200-2 are deployed as a pair, allowing robotics to swap modules from both sides of the vehicle simultaneously. The electric vehicle 102 can pull in between the CCSSs 200-1, 200-2 such that they can access both sides of the electric vehicle 102. This arrangement may feature vehicle entry/exit barriers that block/allow vehicles to enter for swapping energy modules. These barriers may also be doors that mitigate wind-driven rain and/or snow. For illustrative purposes only, CCSS 200-1 includes a self-serve terminal 202 from which the user can manually exchange energy modules. The self-serve terminal 202 may also be located on a front side of the CCSS 200 instead of on the side facing the electric vehicle 102. However, in other embodiments, the CCSS 200-1 may also be configured similar to CCSS 200-2 with an opening and robotic arm 406. The user can communicate with the self-serve terminal 202 using a user interface of the self-serve terminal 202 (e.g., a touch-screen interface) and/or using a smart phone interface that is deployed to a user's smart phone or app. The self-serve terminal 202 illustrates energy modules with a handle on the front portion of the energy module. This allows the energy module to be grasped by the user and removed by pulling the energy module out away from the self-serve terminal 202. The energy module can then be inserted in the reverse direction into the electric vehicle using an opposite motion and pushing the energy module in to the receptacle of the electric vehicle by the handle.

In this embodiment, the CCSSs 200-1, 200-2 can exchange energy modules 104 from any location on the electric vehicle 102. To exchange energy modules 104-3 from side of the electric vehicle 102, the robotic arm 406 can bring one or more charged energy modules through the opening 306 in the CCSS 200-2 and extent outward to interface with the side-load rack of the electric vehicle 102. Robotic arm 406 may cantilever out past the enclosure of the CCSS 200 in order to interact with the electric vehicle 102. Thus, the robotic arm 406 may feature a telescoping boom in one of its sections 408, 410 to extend its reach. Although not shown explicitly in FIG. 5, the robotic arm 406 may also include a caster wheel that extends from the second section 408 of the robotic arm 406 down to the ground. This can help vertically align the robotic arm 406 and provide stability for moving larger energy modules from electric vehicle.

For energy modules that are located in the front or rear of the electric vehicle 102, a mobile robot 506 can assist in the operation. The mobile robot 506 can have a robotic arm 510 similar to the robotic arm 406 of the CCSS 200, except the robotic arm 510 of the mobile robot 506 is not confined to a set of rails 404 or to the interior of the CCSS 200. The mobile robot 506 can exchange energy modules from the front or rear of the electric vehicle 102, and trade those energy modules either with fresh energy modules from the interior of the CCSS 200 and/or with the robotic arm 406 of the CCSS 200. Stated another way, the mobile robot 506 can either retrieve energy modules from storage racks 402 of the CCSS 200 independent of the robotic arm 406, or the mobile robot 506 can exchange energy modules with the robotic arm itself 406.

In some embodiments, the mobile robot 506 can have a learning mode. This learning mode can have a track/follow-me feature from a base station, such as the CCSS 200-2, to the parking area in order for the mobile robot 506 to learn a preferred route to optimize the exchange. Some embodiments may allow a user to use a handheld tracking device, such as a remote control, a smart phone, and so forth, to establish the route that the mobile robot 506 should follow. To move, the mobile robot 506 can use three or more wheels or a set of tracks to allow it to traverse a variety of terrains, surfaces, and/or weather conditions. The mobile robot 506 can include a frame with a telescoping mount that may be raised and/or lowered as necessary to reach energy modules located in different positions on the electric vehicle 102. Aside from the vertical travel made possible by the telescoping frame, the effector can also move forward and backward to push/pull energy modules from the shelves of the CCSS 200 and/or the enclosures of the electric vehicle 102. In addition to transporting energy modules, the mobile robot 506 can also have payload capabilities such that multiple energy modules 520 can be transported at once in the mobile robot 506 to minimize the number of trips required.

The mobile robot 506 may be contrasted with other robot embodiments that raise/lower batteries from underneath electric vehicle. The mobile robot 506 can instead pull energy modules out from a side-mounted configuration of the electric vehicle. The effector 412 may be configured to grasp or be inserted into a handle of the energy modules and may thereby pull the energy modules out from a side, front, or rear of the electric vehicle. The mobile robot 506 is not required to move underneath the electric vehicle, nor does any weight calculation need to be performed to determine whether the effector 412 has engaged with the energy module. Instead, the energy module can insert the effector 412 into a handle of the energy module, turn the handle to disengage the energy module from the electric vehicle interface, and pull the energy module out of the electric vehicle from the side. The effector 412 can determine that it has properly engaged with the handle of the energy module by using contact sensors that indicate when the effector 412 has mechanically mated with the handle correctly. The sensors may be in the effector itself 412 and/or in each of the handles of the energy modules. Each of the energy modules may be wirelessly communicate to the mobile robot 506 when the mating is complete, or the mating itself may create an electrical connection between the energy module in the mobile robot 506 and allow for communication. For example, the effector 412 may include a terminal that can be mated with a corresponding terminal on the face of the electric module. These terminals can be mated together when the effector 412 is properly engaged.

The robotic arm 510 of the mobile robot 506 can have an effector 412 may be similar to the effector of the robotic arm 406. The effector 412 may be configured to grasp the standard human handle of the energy modules, and to rotate, lock/unlock, and perform other interactions that a human would perform on the energy modules during the swapping process. In some embodiments, the effector 412 may include magnets or other means to accelerate the mechanical engagement. Like the robotic arm 406, the effector 412 of the mobile robot 506 may allow multiple energy modules to be grasped at once. In some embodiments, the energy modules may utilize electromechanical locking mechanisms that automatically gang a number of energy modules together such that they can be managed as a single unit. Both the robotic arm 406 and/or the mobile robot 506 may include a variety of sensors and/or electromechanical actuators to properly align and orient the energy modules for proper positioning when inserting energy modules into the electric vehicle 102 or onto a shelf in the CCSS 200, including tilt, yaw, level, and other inputs. In some embodiments, the effector can use optical markers and sensors to locate energy modules and perform the exchange. In some embodiments, the human-interface handle may be removed from the energy modules and are placed with electronics and other mating surfaces that are better suited for the effector 412. The removable human-interface handle may be removable and feature RFID chips or other authentication electronics that can be used to initiate the disconnection process.

The mobile robot 506 may include communication capabilities including human-machine interfaces and machine-machine interfaces. The human-machine interfaces may allow the mobile robot 506 to communicate with human users/drivers during the exchange process, and may receive commands through a smart phone or other user device. The human-machine interface may also allow for learning capabilities, status reviews, triggers for the energy module swap, and so forth. The machine-machine interface allows the electric vehicle 102 and/or the mobile robot 506 to communicate with the CCSS 200 and/or other systems in its domain to ensure that energy modules are properly aligned and facilitate the swapping procedure. These interfaces may also allow the robot to trigger the unlocking and release of energy modules from the CCSS 200 and vice versa.

Figure 6:
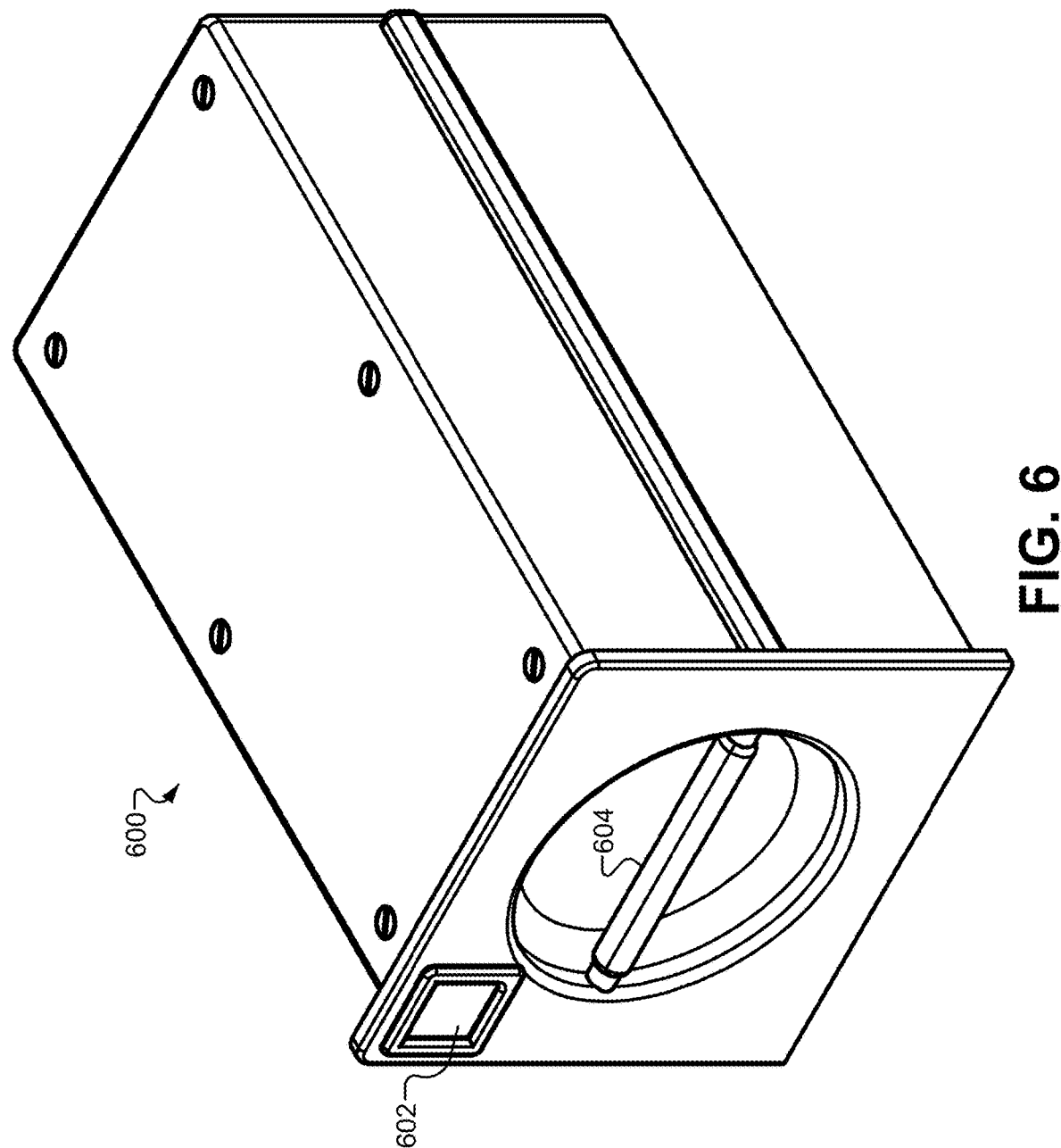
FIG. 6 illustrates a housing and handle of an energy module, according to some embodiments.

FIG. 6 illustrates a housing and handle of an energy module 600, according to some embodiments. While the physical form and volume of the energy module housing can take any shape or size, some embodiments may be approximately 0.25 cubic feet. These embodiments may be approximately 6"×6"×12". Other embodiments may be approximately 0.125 cubic feet. These embodiments may be approximately 3"×6"×12". Energy modules may be stackable on top of each other such that a plurality of energy modules can be connected together in a modular fashion and removed/inserted into the electric vehicle.

A handle 604 can be used to insert/remove the energy module from the electric vehicle or from the CCSS 202. Additionally, the handle 604 can also be used as a locking mechanism to ensure physical contact with the interfaces connecting the energy module with the electric vehicle or CCSS 202. By locking the energy module 600 in place, this can guarantee positive engagement between the interfaces and contact with heat transfer mechanisms and electrical terminals. The energy module 600 can use locking tabs that extend from the sides of the energy module 600 upon rotation of the handle 604. The handle can be spring-loaded such that the handle disengages the locking mechanism when turned. This locking process may engage a master electrical switch, allowing no power flow unless properly engaged, or to act as a master reset on all control, monitoring, and microprocessor activities.

The effector 412 on the robotic arm of the CCSS 202 and/or the mobile robot 506 may include a hook that can be inserted underneath the handle 604. The effector 412 can then be rotated to rotate the handle 604 and cause the locking mechanism of the energy module 600 to be disengaged. The configuration of the handle 604 in FIG. 6 is in an unlocked position. Therefore, when the handle 604 is unlocked, the horizontal orientation of the handle 604 can rest in a cradle of the hook. This allows the effector 412 to both pull the energy module 600 out of its receptacle and hold the weight of the energy module 600 in the hook of the effector 412. Similarly, when inserting the energy module 600 into a receptacle, the effector 412 can rotate the handle 604 into a vertical position to engage the locking mechanism of the energy module 600, and then disengage by moving the hook horizontally out from under the handle 604.

In some embodiments, the housing of the energy module 600 may include an electronic interface 602. The electronic interface 602 may be mated with a corresponding electronic interface on the effector 412 of the mobile robot and/or the robotic arm. This electronic interface 602 can communicate status information of the energy module to the CCSS 202. The electronic interface 602 can also communicate to the robotic arm and/or mobile robot when the effector 412 is properly engaged with the handle 604 of the energy module 600, when the handle 604 is properly turned to disengage the locking mechanisms, and when the energy module 600 is completely removed from the receptacle on the electric vehicle.

Figure 7:
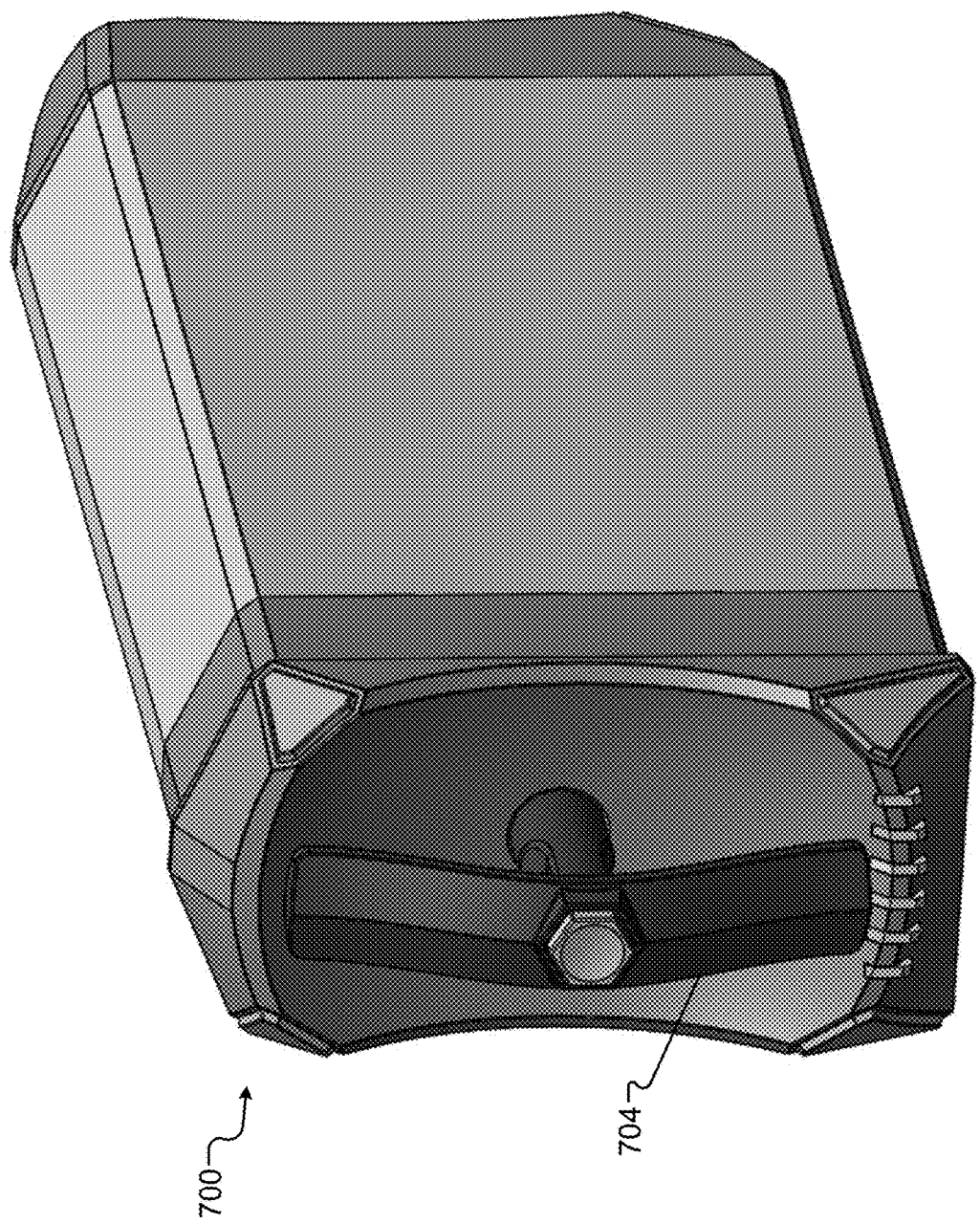
FIG. 7 illustrates an energy module with an alternative handle, according to some embodiments.

FIG. 7 illustrates an energy module 700 with an alternative handle 704, according to some embodiments. In this embodiment, the handle 704 rotates on a center axis that is secured to the energy module 700. The effector 412 may include a plurality of hooks, such as two hooks, that can be inserted underneath both sides of the handle 704, such that at least one hook is inserted underneath each side of the handle relative to the center axis. As described above, the effector can grasp the handle 704 by inserting the hooks underneath both sides of the handle and turning the hook in a direction (i.e., clockwise, counterclockwise) such that the horizontal, unlocked handle 704 will rest in the cradle of the hooks. In some embodiments, the same effector 412 can be used for the embodiments of FIG. 6 in FIG. 7. For example, the two hooks that are inserted on both sides of the center axis of the handle 704 can also both be inserted into the handle 604 of FIG. 6.

These examples of effectors and mating handles on the energy modules are merely exemplary and not meant to be limiting. Other embodiments may use different mating handles on the energy modules in different hooks that are configured to mate with those corresponding handles. In these other embodiments, the key features may include an effector that is configured to mechanically couple with the handle of the energy module in a first position, and cause the handle of the energy module to be actuated into a second position. The second position may unlock the energy module from a housing receptacle on the electric vehicle or the CCSS. While in the second position (or when subsequently moved into a third position), the effector is then configured to maintain its mechanical coupling with the handle and pull the energy module out of the receptacle on the electric vehicle or the CCSS. Additionally, the effectors then configured to support the weight of the energy module by the mechanical coupling of the effector and the handle of the energy module while in the second position (or third position).

Some embodiments may eliminate the need to mechanically actuate the handle between the first and second position. Instead, the effector may be configured to mechanically couple with the handle of the energy module without requiring the handle of the energy module to move. The mobile robot or robotic arm can then communicate electronically with the energy module (wirelessly or via a wired interface connection) to unlock the energy module from the receptacle on the electric vehicle or the CCSS. The effector may then be configured to also mechanically support the weight of the energy module and pull the energy module out from the receptacle. This mechanical coupling in any situation is removable.

Figure 8:
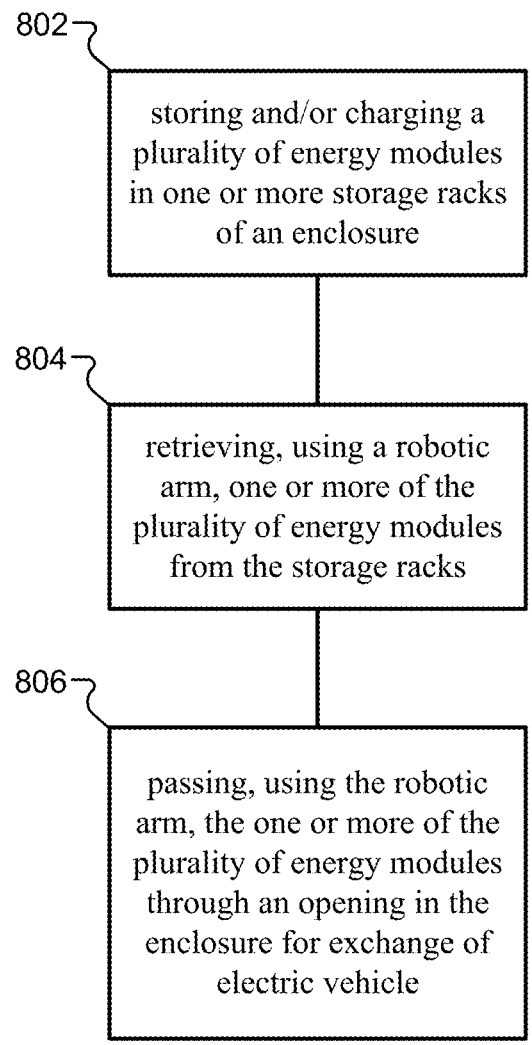
FIG. 8 illustrates a flowchart of a method for automated energy module exchange.

FIG. 8 illustrates a flowchart of a method for automated energy module exchange. The method may include storing and/or charging a plurality of energy modules in one or more storage racks of an enclosure (802). The enclosure may include the CCSS described above or any other enclosure in a mobile facility, fixed location, building management system, roadside center, and so forth. The method may also include retrieving, using a robotic arm, one or more of the plurality of energy modules from the storage racks (804). The method may further include passing, using the robotic arm, the one or more of the plurality of energy modules through an opening in the enclosure for exchange with an electric vehicle (806).

It should be appreciated that the specific steps illustrated in FIG. 8 provide particular methods of automatically exchanging energy modules with electric vehicle. Other sequences of steps may also be performed according to alternative embodiments. For example, alternative embodiments of the present invention may perform the steps outlined above in a different order. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize many variations, modifications, and alternatives.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. An energy module exchange system comprising:
    an enclosure with one or more storage racks configured to store and charge energy modules;
    an opening in the enclosure;
    a robotic arm configured to retrieve the energy modules from the storage racks and pass them through an opening in the enclosure for exchange with an electric vehicle, and also configured to exchange the energy modules directly with the electric vehicle; and
    a mobile robot wherein the robotic arm exchanges the energy modules with a mobile robot, and the mobile robot exchanges the energy modules with the electric vehicle.

2. The energy module exchange system of claim 1, wherein the robotic arm also exchanges energy modules with a human user.

3. The energy module exchange system of claim 1, wherein the robotic arm comprises an effector configured to mate with a corresponding handle of the energy modules.

4. The energy module exchange system of claim 3, wherein the effector comprises one or more hooks configured to be inserted underneath the corresponding handle of the energy modules.

5. The energy module exchange system of claim 3, wherein the effector is configured to actuate the corresponding handle of the energy modules from a first position into a second position, wherein the second position unlocks the energy modules from the electric vehicle.

6. The energy module exchange system of claim 1, further comprising a computerized management system that electronically receives status information from the electric vehicle.

7. The energy module exchange system of claim 1, wherein the one or more storage racks in the enclosure are further configured to store packages from another service, and the robotic arm is configured to deliver the packages to a user of the electric vehicle.

8. A method comprising:
    storing and/or charging a plurality of energy modules in one or more storage racks of an enclosure;
    retrieving, using a robotic arm, energy modules from the storage racks;
    exchanging, using the robotic arm, the first energy modules directly with the electric vehicle;
    passing, using the robotic arm, the second energy modules through an opening in the enclosure for exchange with an electric vehicle;
    receiving, using a mobile robot, the second energy modules from the robotic arm; and
    exchanging, using the mobile robot, the second energy modules with the electric vehicle.

9. The method of claim 8, wherein the robotic arm also exchanges energy modules with a human user.

10. The method of claim 8, wherein the robotic arm comprises an effector configured to mate with a corresponding handle of the energy modules.

11. The method of claim 10, wherein the effector comprises one or more hooks configured to be inserted underneath the corresponding handle of the energy modules.

12. The method of claim 10, wherein the effector is configured to actuate the corresponding handle of the energy modules from a first position into a second position, wherein the second position unlocks the energy modules from the electric vehicle.

13. The method of claim 8, further comprising receiving, using a computerized management system, status information from the electric vehicle.

14. The method of claim 8, wherein the one or more storage racks in the enclosure are further configured to store packages from another service, and the robotic arm is configured to deliver the packages to a user of the electric vehicle.

* * * * *